(12) United States Patent
Canty et al.

(10) Patent No.: US 10,284,716 B2
(45) Date of Patent: May 7, 2019

(54) COMMUNICATIONS RECORDER SYSTEM

(71) Applicant: INTEGRATED RESEARCH LIMITED, North Sydney, New South Wales (AU)

(72) Inventors: Thomas Canty, North Sydney (AU); John Dunne, Denver, CO (US); Stewart Wright, Middlesex (GB); Eric Ulevik, North Sydney (AU); Chris Dorrington, North Sydney (AU); Jacob Moonen, North Sydney (AU)

(73) Assignee: INTEGRATED RESEARCH LIMITED, North Sydney, NSW (AU)

( * ) Notice: Subject to any disclaimer, the term of this patent is extended or adjusted under 35 U.S.C. 154(b) by 0 days.

(21) Appl. No.: 15/311,503

(22) PCT Filed: May 22, 2015

(86) PCT No.: PCT/AU2015/000304
§ 371 (c)(1),
(2) Date: Nov. 15, 2016

(87) PCT Pub. No.: WO2015/176117
PCT Pub. Date: Nov. 26, 2015

(65) Prior Publication Data
US 2017/0094055 A1 Mar. 30, 2017

(30) Foreign Application Priority Data

May 22, 2014 (AU) ................................ 2014901904
Dec. 22, 2014 (AU) ................................ 2014905201

(51) Int. Cl.
*H04M 3/42* (2006.01)
*H04M 7/00* (2006.01)
*H04M 3/51* (2006.01)

(52) U.S. Cl.
CPC ....... *H04M 3/42221* (2013.01); *H04M 7/006* (2013.01); *H04M 7/009* (2013.01);
(Continued)

(58) Field of Classification Search
CPC ... H04M 3/42221; H04M 7/006; H04M 7/009
See application file for complete search history.

(56) References Cited

U.S. PATENT DOCUMENTS 5,495,521 A    2/1996  Rangachar
6,959,078 B1 * 10/2005 Eilbacher ................ H04M 3/51
                                                          379/265.03

(Continued)

OTHER PUBLICATIONS

International Search Report dated Aug. 26, 2015 in International Application PCT/AU2015/000304, filed May 22, 2015.
(Continued)

*Primary Examiner* — Joseph E Dean, Jr.
(74) *Attorney, Agent, or Firm* — Knobbe Martens Olson & Bear, LLP

(57) ABSTRACT

A method for analysing performance of a media recording system in a telecommunications network comprising the steps of selecting an extension within a telecommunications network, the extension capable of exchanging communication media, designating a time period within which communication records for the extension should be analysed, receiving communications data for the network extension, the communications data comprising data associated with communications involving the extension with the time period, receiving media data for the network extension, the media data comprising data associated with recorded media content of communications involving the extension within the time period, comparing the communications data with the media data to determine the performance of the communications recording system.

18 Claims, 7 Drawing Sheets

(52) U.S. Cl.
CPC .......... *H04M 3/51* (2013.01); *H04M 2201/18* (2013.01); *H04M 2203/301* (2013.01)

(56) References Cited

U.S. PATENT DOCUMENTS

| | | |
|---|---|---|
| 8,270,588 B2 | 9/2012 | Schwartz |
| 2005/0018622 A1 | 1/2005 | Halbraich et al. |
| 2010/0128854 A1 | 5/2010 | Lacroix et al. |
| 2012/0005250 A1* | 1/2012 | Asveren .................. H04L 65/00 709/201 |
| 2012/0072453 A1 | 3/2012 | Guerra et al. |
| 2014/0351256 A1* | 11/2014 | Gluck ............... G06F 17/30752 707/740 |

OTHER PUBLICATIONS

Partial Supplementary European Search Report dated Dec. 19, 2017 for International Application No. PCT/AU2015/000304, filed May 22, 2015.

* cited by examiner

COMMUNICATIONS RECORDER SYSTEM

BACKGROUND

In recent years, regulations have required various business segments, finance, health care, emergency services, insurance, financial trading and others to record all voice calls made or received. Although these businesses make every effort to be compliant, in some cases the call quality, call recording, or some other unforeseen event causes the recording to fail unbeknownst to the business, particularly the case when the voice calls and recording are occurring in the highly complex VoIP environment. This inadvertent missed recording can result in severe fines and penalties when uncovered during an audit.

SUMMARY OF THE INVENTION

Embodiments of the invention provide a call analysis centre that monitors and reports on IPT and call recording systems to protect the business against events where calls are being made but the associated call recordings are not being made. Embodiments of the invention protect and inform the business in the event of:
  Voice Recorder status and issues threatening call recording
  PBX status and issues threatening call recording
  Network status and issues threatening call recording
  Embodiments of the Invention sit atop both the PBX and Voice Recorder, monitoring to assess the call recording metrics from both entities.
Features
  The embodiment of the invention has the following features:
    Alert per extension on recordings missing completely in a configurable, wall-clock aligned time bucket
    Future embodiments of the invention will have the following features:
Daily Check Feature
  Are the necessary resources available to perform call recording successfully?
    Disk space
    Processing power
    Necessary software
    Necessary firmware/hardware
Call in Progress (In Flight) Feature
  Count of voice streams valid
  Mean Opinion Score (MOS) is adequate (e.g. >3.4)
Call Complete Feature
  Verify Voice Recorder media created and of expected size and duration
Call Replay Feature
  Is the MOS adequate
  Random replay function to ensure logged calls still have associated and proper media
  Analysis of media content to ensure valid audio recording is present in the call recording system
Abandon Feature
  Forced termination of calls failing checks
  "Whisper" to business concern end-point with suggested or delayed termination
  Alarm but proceed (e.g. emergency calls)
  Role dependent call abandonment functionality
Reporting Feature
  Report all recorded calls with appropriate metrics
  Call abandonment analysis reports-probable cause and recommended actions
  Configurable reports based on roles
  Alarm reports
  Configurable reporting mechanisms (text, phone, document, notifications)
Cradle to Grave Feature
  Trace a call from when it starts to when it stops, including showing all routed devices, voice and signaling paths and recording functionality.

In a first aspect the invention provides a method for analysing performance of a media recording system in a telecommunications network comprising the steps of:
selecting an extension within a telecommunications network, the extension capable of exchanging communication media;
designating a time period within which communication records for the extension should be analysed;
receiving communications data for the network extension, the communications data comprising data associated with communications involving the extension with the time period;
receiving media data for the network extension, the media data comprising data associated with recorded media content of communications involving the extension within the time period; and
comparing the communications data with the media data to determine the performance of the communications recording system.

Embodiments of the invention comprise the further steps of:
receiving rules defining whether a communication should be recorded; and
applying rules to the communications data to create filtered communications data, the filtered communications data associated with communications which should have been recorded;
wherein the filtered communications data is compared with the media data.

In embodiments of the invention the step of comparing comprises the steps of matching the communications data to the media data to identify communications data corresponding to recorded media content.

In embodiment of the invention communications data includes at least one of the following:
ANI;
DNIS;
start time of communication;
end time of communication:
duration of communication;
extension number of parties engaged in the communication;
time of communication;
calling extension;
receiving extension;
recorder ID;
call ID;
location of participants in communication.

An embodiment of the invention comprises the step of:
analysing the communications data to identify a communications scenario including a plurality of communications data;
calculating an expected number of media recordings from the analysed communications data; and
wherein the step of comparing the communications data with the media data compares the expected number of media recordings with media data.

In an embodiment of the invention communications scenarios include at least one of: call transfers; and, multiparty calls.

In an embodiment of the invention calls started within a predetermined time of the time interval are disregarded.

In an embodiment of the invention communications data relating to communications having a duration below a predefined time period are discarded.

In an embodiment of the invention the performance of the communications recording system is determined on whether the number of expected media recordings matches the number or media records.

In an embodiment of the invention the step of triggering an alert in dependence on the performance of the media recording system.

In an embodiment of the invention the extension is associated with a communications device.

In an embodiment a plurality of extensions are associated with a communications device.

In an embodiment the communication is an audio communication.

In an embodiment the communication media comprises speech based audio streams.

In a second aspect the invention provides a call management system comprising:
a call processing system configured to connect calls within a communications network;
a call recording system configured to record call media associated with connected calls within the communications network;
a first rules database comprising criteria for selecting a first set of calls to be recorded, the first rules database associated with the call processing system;
a second rules database comprising criteria for selecting a second set calls to be recorded, the second rules database associated with the call recording system;
an analysis system configured to compare the criteria of the first and second rules databases and determine whether the first set of calls matches the second set of calls.

In an embodiment the rules of the first and second rules database specify that calls should be recorded in dependence on at least one of:
time of communication;
calling party extension;
receiving party extension.

In a third aspect the invention provides a method for recording communications on a communications network comprising the steps of:
receiving a request to connect a communication across the communications network at a call processing system;
determining whether the communication should be recorded;
instructing a recording system to record the call in dependence on the determination.

In a fourth aspect the invention provides a system for analysing performance of a media recording system in a telecommunications network comprising:
processor for selecting an extension within a telecommunications network, the extension capable of exchanging communication media;
processor for designating a time period within which communication records for the extension should be analysed;
receiver for receiving communications data for the network extension, the communications data comprising data associated with communications involving the extension with the time period;
receiver for receiving media data for the network extension, the media data comprising data associated with recorded media content of communications involving the extension within the time period;
matching engine for comparing the communications data with the media data to determine the performance of the communications recording system.

An embodiment comprises:
memory storing rules defining whether a communication should be recorded; and
data filter applying rules to the communications data to create filtered communications data, the filtered communications data associated with communications which should have been recorded;
wherein the filtered communications data is compared with the media data.

In an embodiment the step of comparing is performed by the matching engine matching the communications data to the media data to identify communications data corresponding to recorded media content.

In an embodiment communications data includes at least one of the following:
ANI;
DNIS;
start time of communication;
end time of communication:
duration of communication;
extension number of parties engaged in the communication;
calling extension;
receiving extension;
recorder ID;
call ID;
location of participants in communication.

An embodiment comprises a processor for analysing the communications data to identify a communications scenario including a plurality of communications data and calculating an expected number of media recordings from the analysed communications data;
wherein the step of comparing the communications data with the media data compares the expected number of media recordings with media data.

In an embodiment communications scenarios include at least one of:
call transfers; and,
multiparty calls.

In an embodiment calls connected within a predetermined time of the time interval are disregarded.

In an embodiment communications data relating to communications having a duration below a predefined time period are discarded.

In an embodiment the performance of the communications recording system is determined on whether the number of expected media recordings matches the number or media records.

An embodiment comprises an alert means to trigger an alert in dependence on the performance of the media recording system.

In an embodiment the extension is associated with a communications device.

In an embodiment a plurality of extensions are associated with a communications device.

In an embodiment the communication is an audio communication.

In an embodiment the communication media comprises speech based audio streams.

In a fifth aspect the invention provides a method for verifying the configuration of a call recording system having a call processing system configured to connect calls within a communications network and a call recording system configured to record call media associated with connected calls within the communications network, comprising the steps of:

retrieving a first rules database comprising criteria for selecting a first set of calls to be recorded, the first rules database associated with the call processing system;

retrieving a second rules database comprising criteria for selecting a second set calls to be recorded, the second rules database associated with the call recording system;

comparing the criteria of the first and second rules databases and determining whether the first set of calls matches the second set of calls.

In an embodiment the rules of the first and second rules database specify that calls should be recorded in dependence on at least one of:

time of communication;

calling party extension;

receiving party extension.

In a sixth aspect the invention provides a system for routing communications on a communications network comprising:

communications routing system configured to receive a request to connect a communication across the communications network at a call processing system;

processor for determining whether the communication should be recorded;

transmitter for transmitting and instruction to a recording system to record the call in dependence on the determination.

In a seventh aspect the invention provides a system for recording communications on a communications network comprising;

communications recording system, the communications recording system comprising;

a receiver for receiving an instruction to record a communication;

processor for determining whether the communication is required to be recorded in dependence on recording rules; and recorder for recording the communication in dependence on the communication being required to be recorded.

In a seventh aspect the invention provides a method for analysing communication records in a telecommunication system comprising the steps of:

receiving across a telecommunications network communication records data, the communication records data comprising data associated with communications involving predetermined communications devices within a designated time period;

receiving across a telecommunications network media recordings data, the media recordings data comprising data associated with media recordings from communications involving the predetermined communications devices within the designated time period;

comparing the communication records data with the media recordings data; and, signalling an alert in dependence on the comparison.

In an embodiment the communication records data identifies whether the predetermined communications device engaged in a communication during the designated time period.

In an embodiment an alert is signalled if, during the designated time period, the communication records data identifies at least one communication involving the predetermined communications device and the media recordings data comprises no media.

In an eighth aspect the invention provides a system for analysing communication records in a telecommunication system comprising:

receiver for receiving network communication records data across a telecommunications network, the communication records data comprising data associated with communications involving predetermined communications devices within a designated time period;

receiver for receiving media recordings data across a telecommunications network, the media recordings data comprising data associated with media recordings from communications involving the predetermined communications devices within the designated time period;

processor for comparing the communication records data with the media recordings data; and, means for signalling an alert in dependence on the comparison.

In an embodiment the communication records data identifies whether the predetermined communications device engaged in a communication during the designated time period.

In an embodiment an alert is signalled if, during the designated time period, the communication records data identifies at least one communication involving the predetermined communications device and the media recordings data comprises no media.

Embodiments of the invention comprise a transmitter for requesting network media recordings data.

Embodiments of the invention comprise the step of requesting network media recordings data.

BRIEF DESCRIPTION OF THE FIGURES

Preferred forms of the invention are now described by way of example only with reference to the accompanying figures in which.

DETAILED DESCRIPTION

Overview

Figure 1:
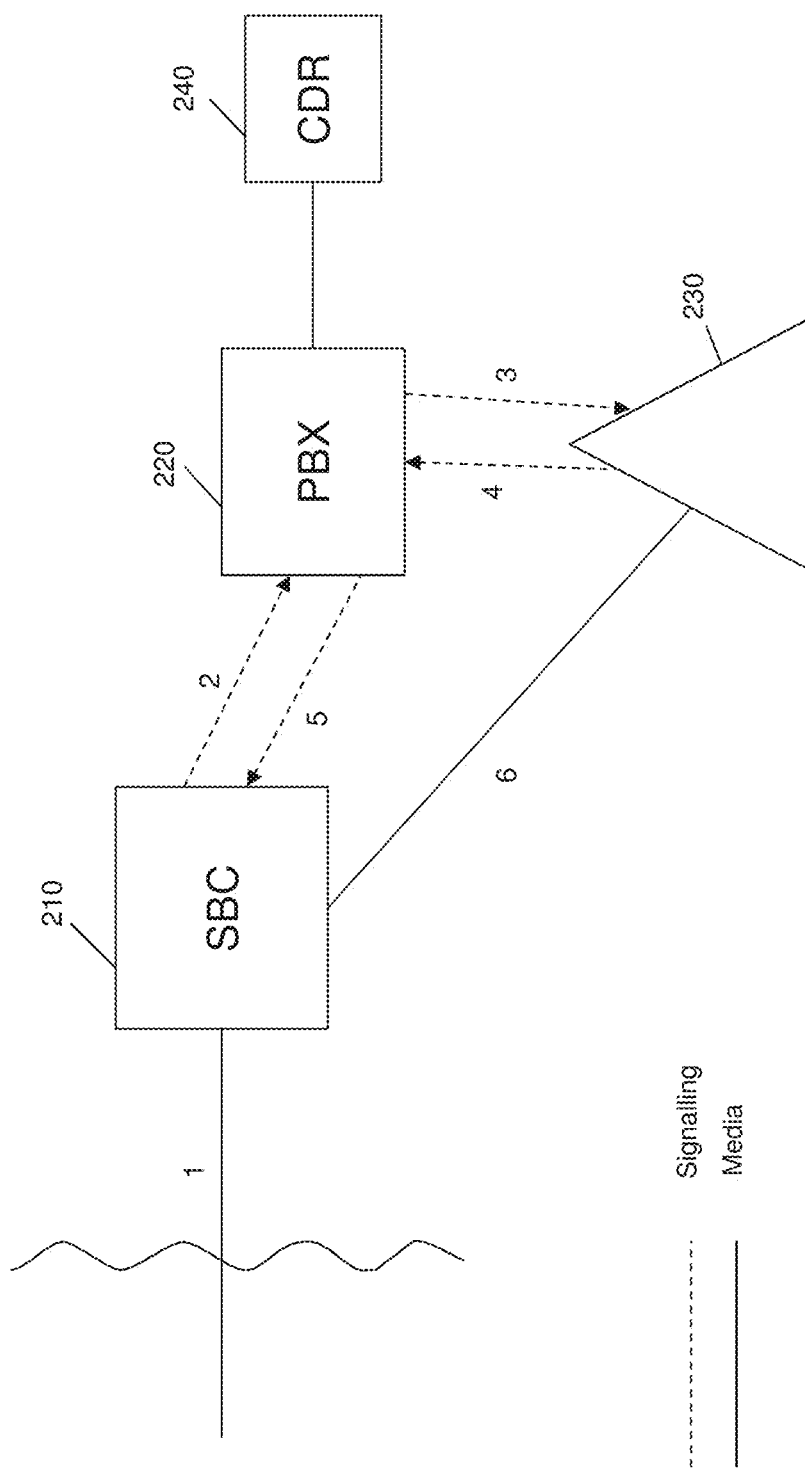
FIG. 1 illustrates an architecture of a telephony system.

Embodiments of the present invention relate to recording systems for recording communications in a communication network. Preferably the network is a telephone network recording audio data relating to telephone calls.

Embodiments of the invention operate in a telephone network in which calls to certain extension numbers, devices or individuals are required to be recorded, for example due to regulatory requirements. For example, embodiments of the invention may be integrated onto the telephone network of a financial services company, in which calls to and from certain individuals are required to be recorded. Typically, banking regulations require calls involving brokers or traders engaging with external third parties to be recorded.

In some telephone systems not all calls are required to be recorded. Embodiments of the invention implement rules to determine whether or not a call should be, or should have been, recorded. In some environments, only a subset of calls are required to be recorded for compliance or regulatory purposes, this may be defined by geographical site or by business unit. Embodiments of the invention map site or business units to a set of extension numbers, given by a dial plan number mapping. Rules for recording may include white lists and black lists to define extension numbers to include and exclude from call recording assurance alerting. Embodiments of the invention enable the system to be user configurable.

Embodiments of the invention capture call detail records associated with the call, for example ANI (Automatic Number Identification, DNIS (Dialled Number Identification Service), start time, call duration, extension number, agent ID, recorder ID, call ID, UCID (Universal Call ID), site ID. Rules are applied to the call data to determine whether or not a call is required to be recorded. Rules may be configured for the specific network and include recording requirements based on individual extension number, device ID, business area and time of day. Call records relating to calls which should be recorded are identified.

In embodiments call recording is implemented in a call recording system. The call recording system creates a media file and a session record for each recorded call. Embodiments of the invention determine whether or not a call should be recorded based on the rules. In further embodiments, all calls may be recorded.

Embodiments of the invention include a call matching system which receives call records for calls which should have been recorded. The call matching system interrogates the call recording system and matches the session records with the call records. Various matching rules are implemented to provide visibility of which calls are recorded successfully and those which are not recorded successfully. In the event that a session record does not exist for a call which should have been recorded the system raise an alarm.

Embodiments of the invention provide alerting on missed call recordings and other critical failure points in call recording integration. This provides the ability to automate auditing and compliance activities within an enterprise, for example contact centre business or trading floor.

The call matching system includes a range of system exclusion rules that are designed to exclude internal system transaction and avoid false positive alerts. Examples include call detail records that are utilized for record events to the call recording system. Other call recording records can be excluded, including zero duration calls and short duration calls based on a configurable parameter set in the call recording system.

Multi-line Support for Call Recording Assurance

In embodiments, the call recording system can handle recording of multi-line phones, such as those with a primary ACD line and a secondary private line. Such phones enable multiple extension lines to be directed to a single phone unit. The call matching algorithm handles derivation of complex call scenarios using primary and secondary lines on a single phone. This is required to handle complex call types, including hold, transfer and conference scenarios. This mapping mechanism can be derived.

Embodiments of the invention work across a number of different call recording integration models including:

Phone side recording, in which calls are recorded at the device;
This recording model forks the media from each agent phone in the environment.

Trunk side recording, including TDM/IP based systems
This recording model uses a physical network tap on the TDM to record the information trunk side.
Passive TAP recording,
This recording model copies the network traffic of the Network switch to the recorder.
SIP based recording systems, including the use of SIPREC standards
This recording model forks the media at the Session Border Controller Embodiments of the call matching system map calls involving each extension into individual configurable time buckets for alerting. In complex call scenarios, for example conference calls, call transfer and call holding, multiple call records are created and there is not a 1-1 match between call detail records and call session records.

The bucket size is a configurable parameter, based on the underlying delays of the call recording session recording as well as the call generation system producing call detail records. Embodiments handle complex scenarios including multi-line support, inbound calls, followed by a series of holds, transfers and conferences.

Embodiments of the invention are able to group complex call scenarios together, and only alert on the complete transaction and not provide false positive alerts on partial results within the call types.

Embodiments of the invention operate in systems where calls are recorded at different locations in the network. Embodiments analyse different call scenarios, for example when calls are placed on hold, calls are rerouted, or when a conference is established to include more than two parties.

Worksheet Feature

Embodiments of the invention detect issues with badly configured integrated routing equipment. This can be utilized to automatically detect business rule configuration mismatches between the call recording system and the call processing system. Such errors could be present due to manual installation errors that cause call recording to fail in this environment. This allows automatic determination of configuration mis-matches between the call recording system and the call processing system.

End to End Monitoring of Critical Integration Points

Embodiments of the invention can be utilized to monitor critical application level failures in the call recording system, this can be integrated with alerts which can be utilized to provide alerts on the key integration links between the systems.

The critical integration points include interaction with the PBX, ACD or Turret system, as well as the geographical distribution of call recording systems into data centre and site architectural components respectively.

Voice Quality Feature

Embodiments of the system monitor the call session data records and alert when in-flight Mean opinion score (MOS) score to the call recording system is inadequate. This feature can be important for centralized call recording models that require longer IP transport of the RTP media involved in the call, with the chance of introducing packet loss, jitter or latency which will degrade the quality of the recording.

Cradle to Grave Feature

This feature traces a call from when it starts to when it stops, including showing all routed devices, end to end voice and signalling paths and recording functionality across session border controllers (SBCs), PBX/ACD devices all the way to the end phone or agent device. This feature can be used to correlate which devices have been involved in calls without valid call recordings.

Active Call Recording Test

In addition to passive call recording capability, embodiments of the invention incorporate active call recording to validate critical parameters of the call including:

Whether valid CTI attached data is available for the call;
Whether the file is of the correct file size and contains valid audio recording sample.

This can be done utilizing the passive data feed from the call processing system. This can be utilized as an automatic mechanism for providing validation, in combination with the active call recordings described earlier.

Archiving Validation Test

Embodiments of the invention provide the capability to validate whether there is a valid media archive for a sample call scenario. This can be done by validating the file archive is valid off the storage area network (SAN) or content addressable storage system(s) utilized by the call recording system, such as NetApp or EMC Centura. This archiving validation can utilize old call sample data to identify calls to validate against the archiving system.

Description of the Figures

An embodiment of the invention is now described with reference to the accompanying drawings. FIG. 1 illustrates the signalling and media links between components of the architecture of a telephony network. At step 1 an incoming call arrives at SBC 210.

On receipt of the call at step 2 the SBC signals the PBX. The signalling includes details such as the destination party. PBX 220 identifies the target communication device and signals the target communications device 230 at step 3 that it should establish a media connection to SBC 210. Communication device 230 signals back to the PBX at step 4 and at step 5 the PBX sends signalling back to the SBC 210 to enable media connection to communications device 230. At step 6 communications device 230 and SBC 210 establish a media connection. After completion of step 6 the external caller is connected with communications device 230 and the parties can communicate.

The PBX is connected to memory 240 to store information about calls. The information is stored as a Call Detail Record (CDR). The CRD includes various information relating to the call including: ANI, DNIS, Start time, End time, Call duration, Extension number of the party engaged in the call, agent ID (for example if an employee is registered with the physical device), Recorder ID, Call ID, UCID, Site ID.

Figure 2:
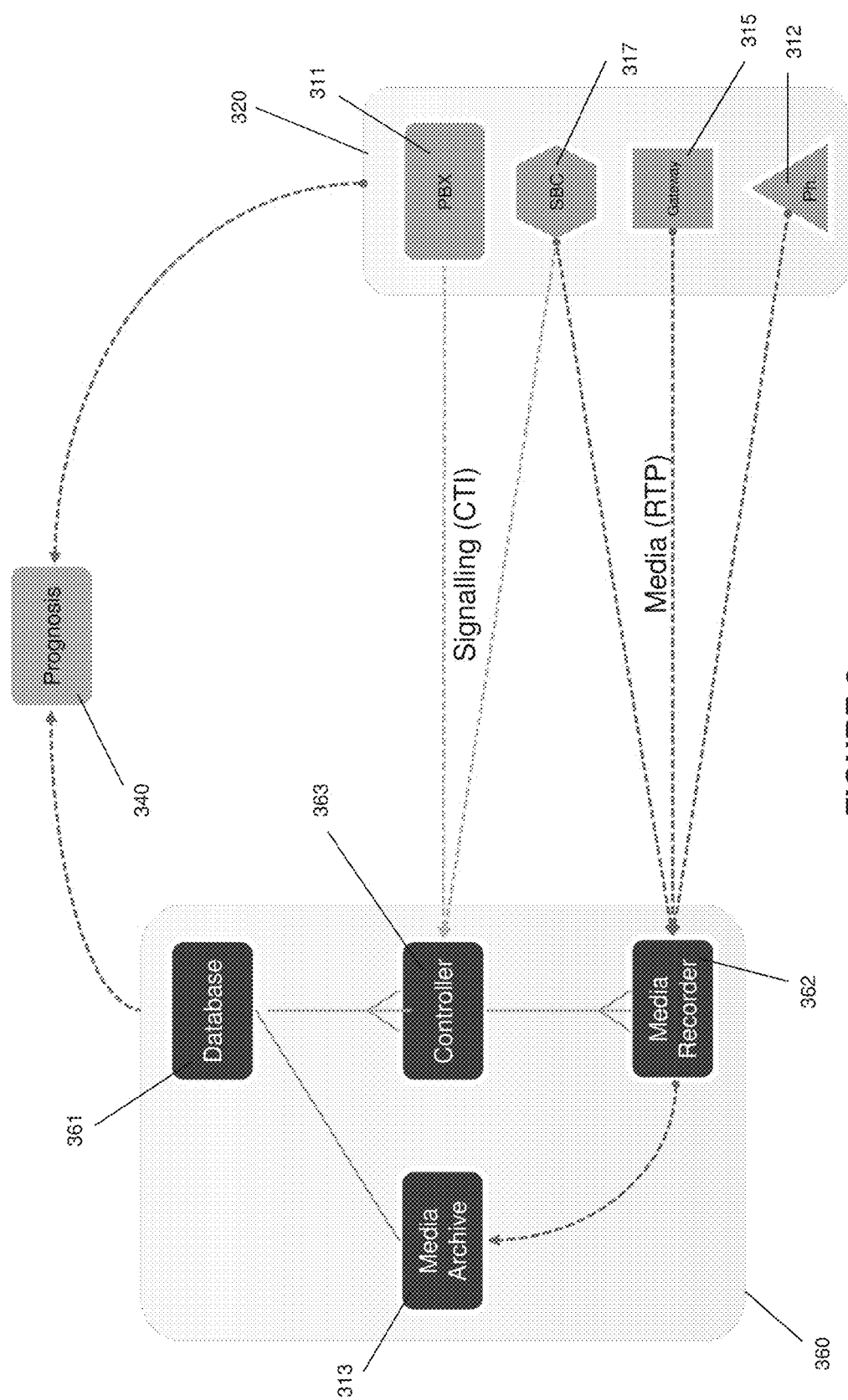
FIG. 2 illustrates an architecture of a telephony system.

The telephony network architecture can be extended to include recording components for recording and storing communication media from telephone calls. FIG. 2 illustrates a telephone network including a call analysis centre 340, call routing architecture 320 and recording system 360. Call routing architecture 320 includes private branch exchange (PBX) 311, Session Border Controller (SBC) 317, routing gateway 315 and communications device 312. Storage device 360 includes media recorder 362, database 361 and media archive 313 as well as controller 363.

Media recorder 362 within recording system 360 can receive media streams for recording from SBC 317, gateway 315 and communications device 312. PBX 311 and SBC 317 can signal controller 363 to indicate when a media stream should be recorded. Controller 363 controls when media recorder 362 records the incoming media streams. Recorded media is stored in media archive 313. Details about the media file are stored in database 361 as session data records. Session data records include information relating to the call including details of the communication device, the media file and the time the file was created. In some cases, further information about the call is stored in in the session data record in database 361. In some cases database 361 includes a link to the associated media file. The session metadata record may be stored as a separate file from the media file or may be stored as part of the media file, for example in the header.

Call analysis centre 340 receives call detail records from PBX 311 relating to communications involving communication device 312.

Call analysis centre 340 pulls or receives session data records from database 361 and may pull copies of the recorded media from storage device 361. The call analysis centre compares the call detail records from the PBX 311 with the session data records of the storage device 361 to determine whether calls are being correctly recorded.

In the example of FIG. 2, rules relating to whether or not a call should be recorded can be implemented in the PBX 311, SBC 317, gateway 315 or device 312 and also in controller 363. On receipt of an instruction to record a call, controller 363 can apply its business rules to the instruction to determine whether to record the call. In situations where the business rules of the call routing architecture are configured differently from those in the recording system 360, the call routing system may identify a call to be recorded which is not identified for recording by the recording system 360. In this situation the call recording system may apply its own rules and not record the call. The situation may arise, for example if the call recording system and the call routing architecture are provided by different vendors or when business rules in the call recording system and the call routing architecture have not been updated simultaneously.

The system includes a matching engine for automatically detecting business rule configuration mismatches. The system compares the rules of the call recording system and the PBX, or call routing system. The system may be configured to compare the rules automatically at predefined time periods or may be triggered manually. This system is utilized for detecting inconsistencies with badly configured or integrated PBX/ACD/Turret equipment. This can be utilized to automatically detecting business rule configuration mismatches done manually by users and other issues that cause call recording to fail in this environment. This allows automatic determination of configuration mis-matches between the call recording system and the call processing system.

Figure 3:
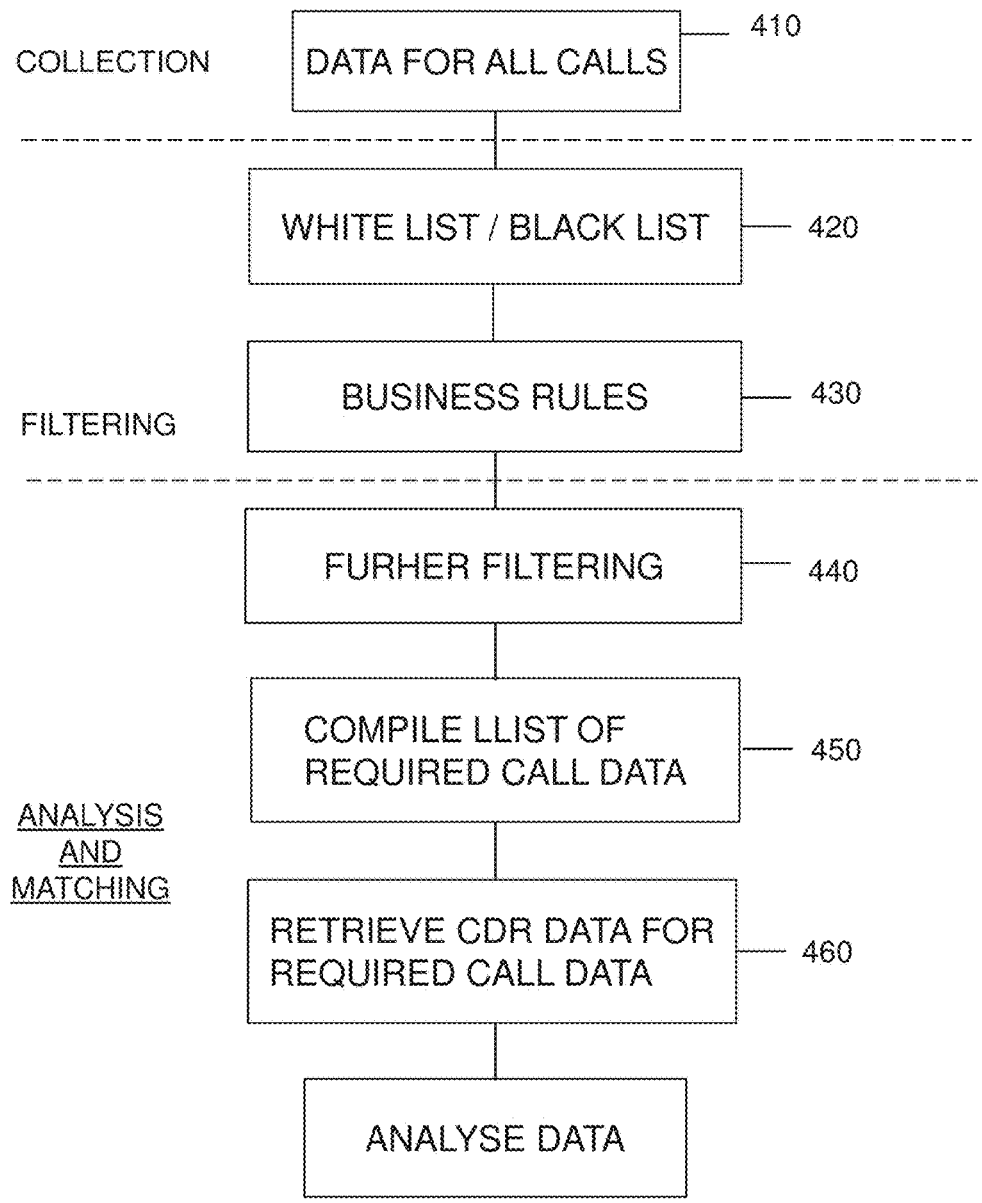
FIG. 3 is a flow diagram showing steps performed by an embodiment.

FIG. 3 is a flow diagram showing the steps taken in a telephone network implementing an embodiment of the invention. The steps of FIG. 3 are implemented in architecture of FIG. 2. At 410 call data is collected at the PBX or SBC. As discussed above, the call data can include multiple fields including ANI, DNIS, start time, call duration, extension number, agent ID, recorder ID, call ID, UCID, site ID.

The business rules relating to recording requirements are loaded into PBX 311/SBS 317. Before call data is passed to call analysis centre 340 it is filtered. As discussed above there are several options for identifying whether or not a call should be recorded. The first filter run on the data is to identify whether the extension number belongs to an agent or a device identified on a whitelist or a blacklist. Whitelists identify extensions which are to be recorded; blacklists identify extensions which are not to be recorded.

Blacklists and whitelists are effective when regulatory requirements apply generically across business units or geographical sites and different extension ranges are applied to those different business units or geographical sites, given by a dial plan number mapping. In an example where calls involving financial traders are required to be recorded, if the traders on a trading floor of a bank are all provided with extension numbers starting with 2 0, then a whitelist is created identifying all extension numbers starting with digits 2 0.

Continuing with the example, if regulations require that certain business units within the bank are generally exempt from being recorded, blacklists can be created identifying extension ranges excluded from recording. For example if the back office settlements team are not required to have their calls recorded by regulation and that business unit has the extension 3 0 then all extensions starting with extension 3 0 can be included on a blacklist and automatically filtered from being recorded.

Embodiments of the system are designed to enable whitelists and blacklists to be individually configured such that any number can be included, and not just those within specific extension ranges.

At 430 additional business rules are applied to the call data. Business rules can operate to filter calls based on other call related parameters. In an example, if trading floor phones are only required to be recorded during market hours, a call received between 0800 and 1600 the call is required to be recoded. However, a call received between 1600 and 0800 it is not required to be recorded.

Further business rules, for example, based on calling party, direction of the call, duration of the call can be applied. The rules can be configured specifically for the requirements of the network.

Call detail records are transmitted to the call analysis centre 340. The data is filtered so as only to include call data records of calls which are required to be recorded. In further embodiments all call detail records may be transmitted to the call analysis centre and filtered at the call analysis centre. Alternatively, the call detail records may be filtered at the routing architecture and labelled before being transmitted. The data may be requested by the call analysis centre 340 or transmitted to the call analysis centre 340 periodically.

Call analysis centre includes processors for executing a call matching algorithm. The algorithm initially applies further system exclusion rules that are designed to exclude internal system transaction and avoid false positive alerts. Examples include call detail records that are utilized for record events to the call recording system. There are also other call recording records excluded, such as zero duration calls and short duration calls based on a configurable parameter set in the call recording system.

Example of System for Executing Call Analysis

Call analysis centre 340 obtains call data records and session data records from the PBXs and recording systems via remote application layer interfaces.

Matching Algorithm

In an embodiment filtered call information in the form of CDRs is retrieved by the call analysis centre from the PBX. The CDR may be retrieved upon completion of the call or may be retrieved periodically and stored in-memory. Data related to recorded media is pulled from database 361 periodically or at regular time intervals and stored in-memory. Preferably the system analyses specific time frames, buckets. The CDR data for the call and the recorded media includes at least the extension numbers engaged in the call, the duration of the call and the end time of the call.

The call analysis centre compiles a list of call data relating to calls which should have been recorded in line rules implementing regulatory requirements at 450. The call analysis centre 340 retrieves data from call recording system at 460 and compares the data of the CDR with the session record relating to the recorded media file for particular communication devices or extensions within the network. The system matches the CDR data with the session data records and flags any situations where the call detail records and session data records do not match. Additionally, the system can interrogate the session data record to determine whether all elements of a call are represented.

Figure 4:
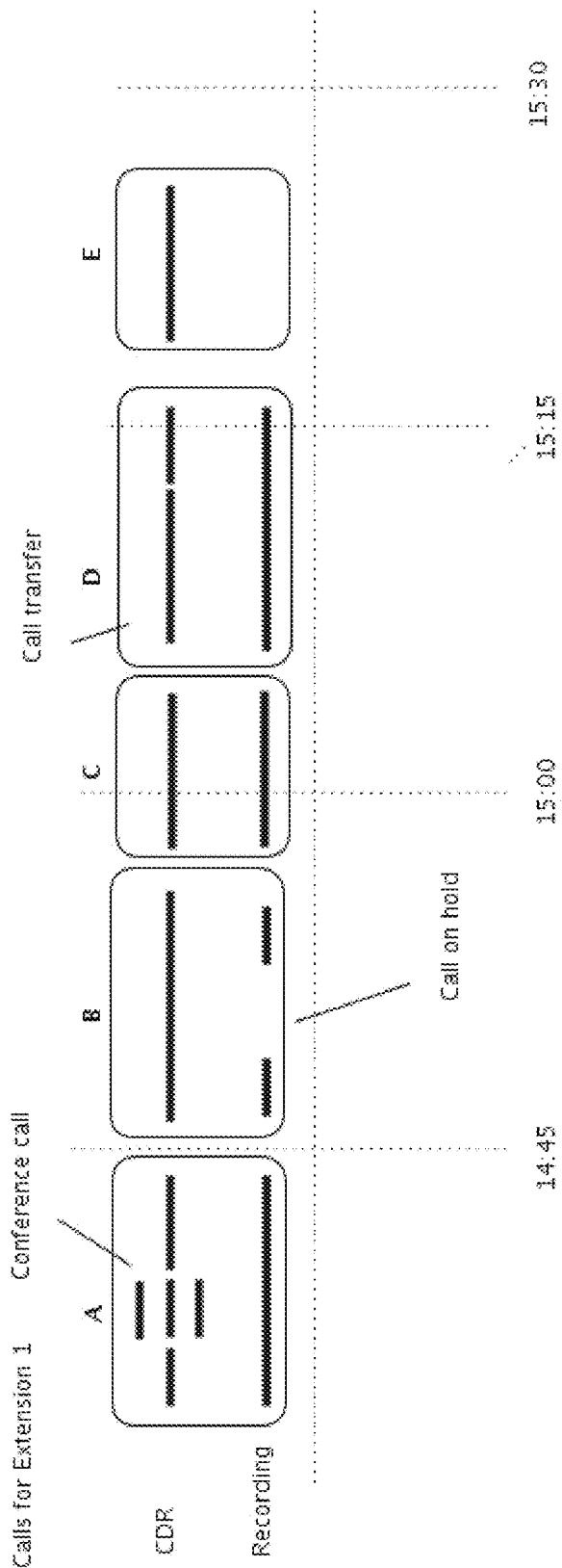
FIG. 4 illustrates data captured from call recording records.

The system is able to handle complex call scenarios in which multiple CDRs correspond to a single session record. FIG. 4 shows a comparison of CDR and recording records for a communication device on agent extension 1. In FIG. 4 calls from each extension are mapped into to individual configurable time buckets for alerting. This is due to the lack of a 1-1 match between call detail records and call recording systems, and the need to handle complex call scenarios which generate large numbers of individual session records.

The bucket size is a configurable parameter, based on the underlying delays of the call recording session recording as well as the call generation system producing call detail records.

In FIG. 4 the comparison of session data records and call detail records is made using data at 15 minute wall-clock aligned intervals (buckets). The matching of calls and recordings is based on data taken from CDR records and recorded media records. Zero-duration CDRs and CDRs directed to the call recording devices are ignored, as well as CDR's with invalid ip addresses in source or destination fields. Each call and recording is assigned to a bucket based on their end time.

In the first step, the call detail records are collected:

Data Collection

1. An extensionmapping (primary to secondary extension mapping) file is input; it is provided by the customer after running an SQL query.
2. It is assumed that the string extension field (the Extension) in the data always contains the primary extension.
3. For each recording row that comes in, a hashset of extension strings is created (HashSetExtensions) that is determined by:

| Direction | Extension in recording is a primary extension in extensionmapping | Extension in recording is not a primary extension in extensionmapping (we try to find the secondary extension ourselves) |
| --- | --- | --- |
| 0 (unknown) | Extension + its secondary extensions from extensionmapping | If (Extension = Caller \|\| Extension = Callee): Extension else Extension + Caller + Callee |
| 1 (inbound) | Extension + its secondary extensions from extensionmapping | If (Extension = Caller \|\| Extension = Callee): Extension else Extension + Callee |
| 2 (outbound) | Extension + its secondary extensions from extensionmapping | If (Extension = Caller \|\| Extension = Callee): Extension else Extension + Caller |
| 3 (internal) | Extension + its secondary extensions from extensionmapping | If (Extension = Caller \|\| Extension = Callee): Extension else Extension + Caller + Callee |

After the call data is collected, a number of requirements are included, for example:

a. The recording must overlap, i.e. StopTime>=ConnectTime and StartTime<=DisconnectTime.
b. If the call is inbound: find if there is any overlapping recording with a HashSetExtensions that contains the finalCalledParty (=the Extension that is being reported on).

c. If the call is outbound: find if there is any overlapping recording with a HashSetExtensions that contains the callingParty (=the Extension that is being reported on).
d. If the call is internal:
 i. Find if there is any overlapping recording with a HashSetExtensions that contains the finalCalledParty or the callingParty (these are the Extensions that are reported on)
 ii. Find if there is any overlapping recording with a HashSetExtensions that contains the finalCalledParty and find if there is any overlapping recording with a HashSetExtensions that contains the callingParty (these are the Extensions that are reported on)
e. Update the status for finalCalledParty (inbound, internal) and/or callingParty (outbound, internal) extensions.

For a certain bucket, for each agent extension (either destination or source, depending on whether the call type is inbound, outbound or internal) the system examines the number of CDRs with endtime within the bucket (#A) and the number of recordings with endtime within the bucket (#B). If there are non-zero values for either #A or #B, the data is presented for this extension in this bucket.

FIG. 4 illustrates some complex call scenarios. A call can have one or more CDR's and one or more recordings, depending on the call scenario. Pictured are 5 calls A, B, C, D and E for agent extension 1 (each rectangle is a call for extension 1).

In the example of FIG. 4 an alert is generated if the number of valid CDR records is nonzero and the number of media records is zero. Because call recordings may be delayed, the system only queries data with endtimes in the past. For example, at 15:21, if the last known recording's endtime is 15:06 for any extension, the call analysis centre only queries for at most the 14:45-15:00 bucket or earlier buckets, but not for the 15:00-15:15 bucket. The delay may depend on the call recording device (type, location), the location of the phone within the network and the call load.

In call A, in the 14:30 to 14:45 bucket a single recording has been made associated with agent extension 1. During the same time period multiple CDRs have been recorded involving agent extension 1. In the example of FIG. 4 a conference call was initiated including multiple parties to create the multiple parallel CDRs involving agent extension 1. In total 5 CDRs are recorded for agent extension 1 during call A. Each CDR relates to a separate component of the call, as if a separate call was initiated within the call. Since a media recording is present in the 14:30-14:45 bucket for agent extension 1, no alert is raised.

In the 14:45 to 15:00 bucket, a single CDR is recorded. Two media recordings are made in the same time period. In call B the break in the media recordings could be due to the call being placed on hold. As discussed above with respect to FIG. 2, the PBX signals the controller to indicate when a recording should be started and stopped. In the example of FIG. 4 media recordings at the media recorder 362 are paused when calls are placed on hold. Again, since a recording is present for the CDR in this bucket, no alert is raised by the system.

The bucket 15:00 to 15:15 involves two calls involving agent extension 1 (calls C and D). Bucket 15:00-15:15 has 2 CDR's and 1 recordings. It will therefore not generate an alert. If call C was absent, an alert would be generated, which is not correct since all calls would have recordings (just not in the 15-min bucket under consideration). This problem is made less severe if the bucket size is selected to be large enough to have at least one other recording if everything is working properly. The choice of bucket size depends on how many calls are made and their duration. The above problem will occur most obviously in certain call scenarios, when starting a conference for instance, so that the call is split over multiple CDR's.

For 'normal' calls, a similar boundary problem may exist if the recording stops just before or after the call finishes. The risk of these false alerts is mitigated by allowing a 'tolerance' time: the calls are taken in an exact 15-minute bucket, but the recordings in a slightly larger bucket, with a tolerance on either side of the 15-minute bucket. The tolerance is configurable and 2 seconds by default.

The bucket 15:15 to 15:30 involves two calls, call D and call E. Bucket 15:15-15:30 has 2 CDR's and 1 recording. An alert will not be generated, although there is a call without recording. If the problem is caused by misconfiguration, it would probably persist into the next bucket and it would alert on it in the next bucket (if there are calls being made). If it is an incident (only one call not recorded), no alert is raised on the incident, which is incorrect.

In further embodiments the system may raise alerts if a particular call includes a CDR but no media recording. In such cases an alarm would be raised on the 15:15 to 15:30 data due to the lack of media recording for call E. These embodiments will also address the other problems mentioned above.

In the example of FIG. 4, using the alert technique discussed above, for none of the time buckets an alert will be generated.

Status

After analysis, each bucket of each extension is given a status. The extension is determined by the finalCalledParty and/or the callingParty in the cdrs. Initially the status of an extension in a bucket is up.

For each CDR with a disconnect time in the bucket:
 If a CDR has no matching recording:status of extension in bucket changes to:

| In white list | In black list | Status |
| --- | --- | --- |
| x | — | 0 (down) |
| x | X | 3 (inblacklist) |
| — | — | 2 (notinwhitelist) |
| — | X | 2 (notinwhitelist) |

If the white list is empty or absent, all extensions are in the white list lithe black list is empty or absent, no extensions are in the black list Alerting An alert is raised for an extension if the status of the extension in a bucket is 0 (Down). The alert is cleared if in a later bucket the status <>0. If in all later buckets the status is still 0, we don't raise new alerts and the text of the alert does not change, so the original bucket in which the alert was raised is still in the alert text.

Figure 5:
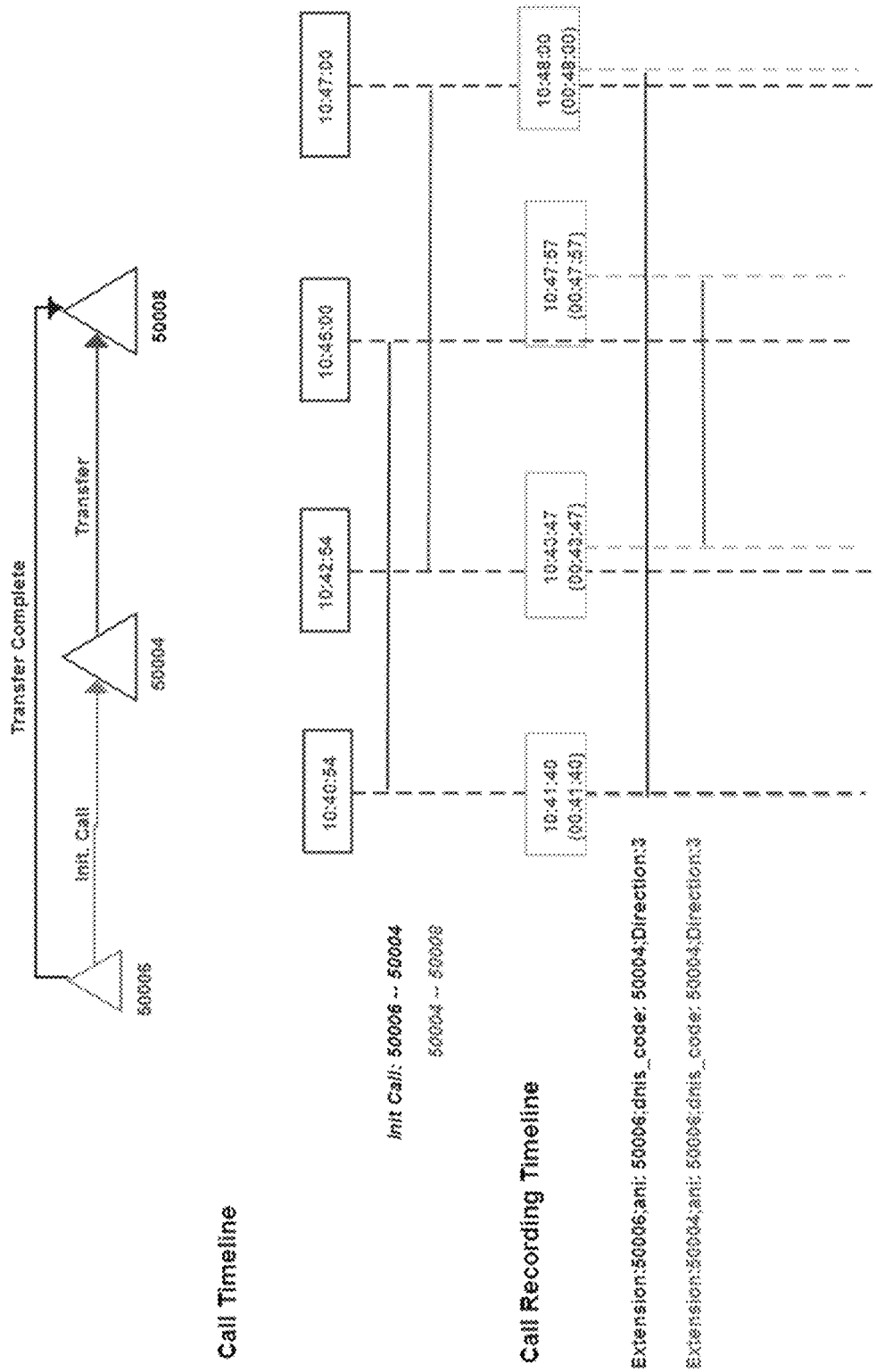
FIG. 5 illustrates a first call scenario.
Figure 6:
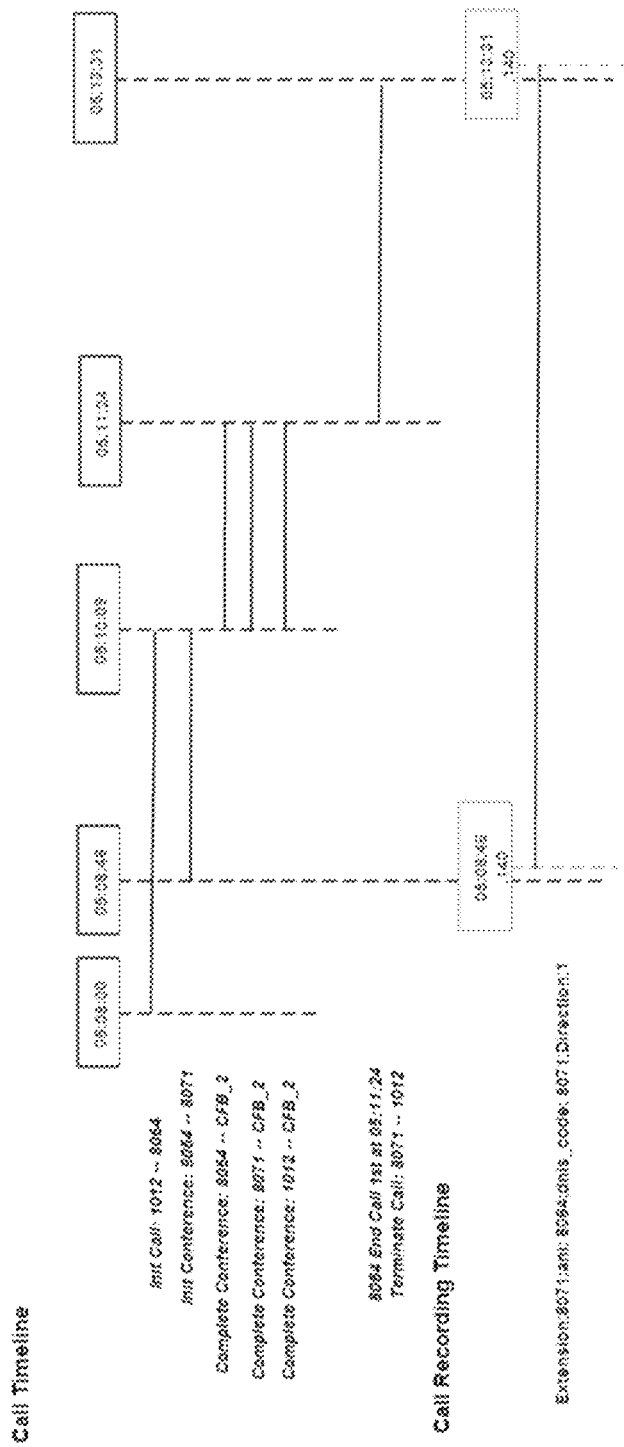
FIG. 6 illustrates a second call scenario.
Figure 7:
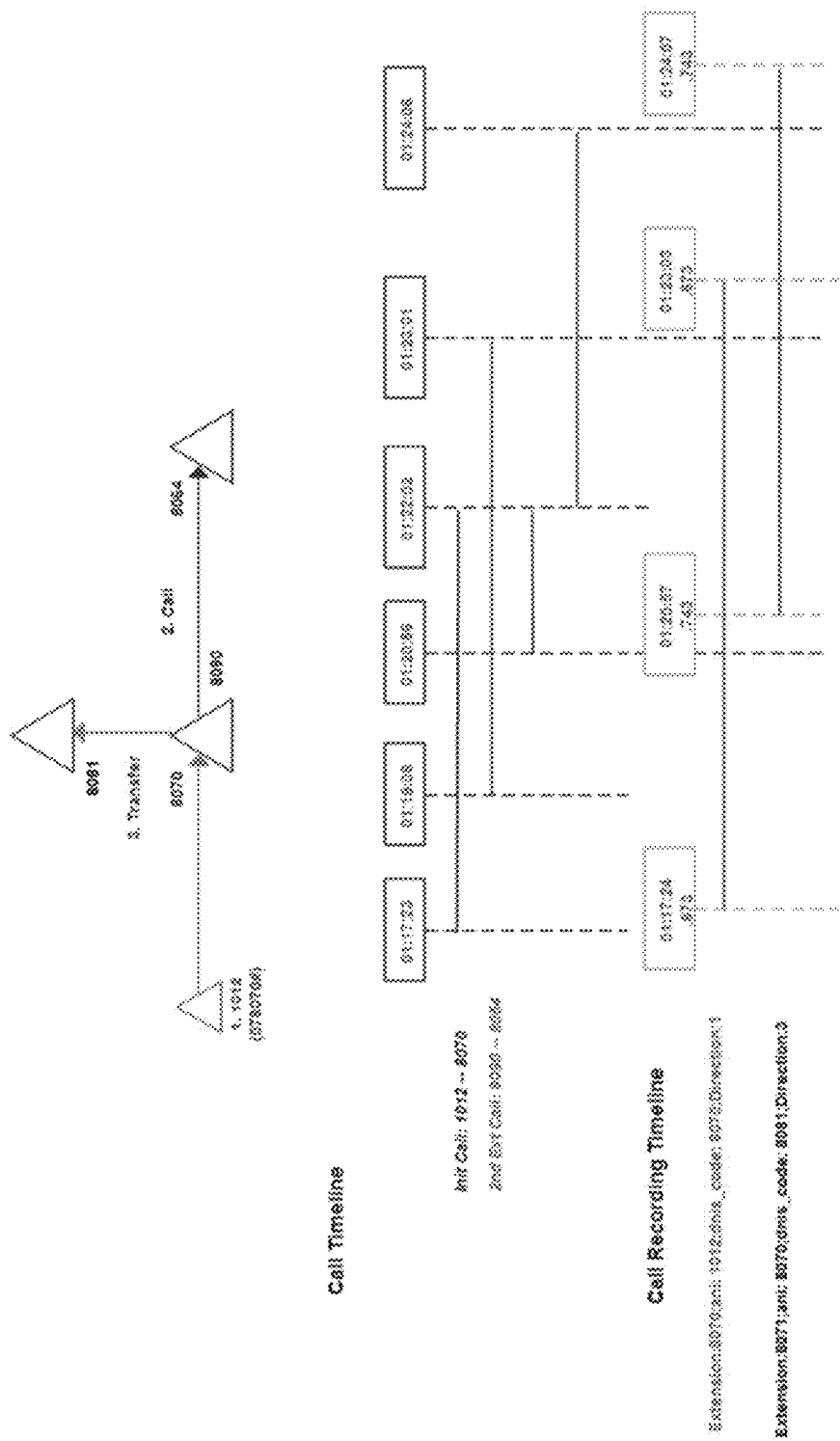
FIG. 7 illustrates a third call scenario.

FIGS. 5 to 7 illustrate examples of call scenarios.

Call Transfer Scenario

FIG. 5 shows the connections between extension numbers 50006 50004 and 50008 in a call transfer situation. The sequence is:

1. Initial call between 50006 and 50004 at 10:40:54;
2. Consulting transfer (50004 tells 50008 that they are transferring the call. After talking they hang up.
3. Transfer complete (50006-50008)

During the period of 10:42:54 to 10:45:00 50004 is connected to both 50006 and 50008.

Times of the call timeline and recording timeline are not exactly overlayed every time since there can be time sync differences between systems which the system caters for.

Conference Call Scenario

FIG. 6 is for a PBX and call recording system conference call and shows the following sequence:
1. At 05:08:00 a call is initiated between extensions 1012 and 8064.
2. At 05:10:09 a conference call is initiated between extensions 1012, 8064, 8074 across conference bridge CFB_2 (A separate data record is created for each participant with the conference bridge).
3. At 05:11:24 8064 leaves the conference and 8071 and 1012 are connected until 05:13:31.

In this case extension 8071 is configured for recording. In the example of FIG. 6 there is a short time delay (0.140 s) between signalling and the initiation of the instruction by the call recording system.

FIG. 7 shows an inbound call transfer with multiline scenario

This scenario is for an inbound call from 1012, which is received at 8070 put on hold, then a secondary line 8090 is used to make a call to another extension 8064. Finally a transfer is made to another extension 8081. The sequence is:
1. Initial inbound call between 1012 and 8070 at 01:17:23;
2. At 01:19:08 a call is established on second line between 8090 (Second line of phone with primary line 8070) and 8064.
3. Call Transfer to 8081 at 01:22:02.

In this case 8070 and 8081 are the extensions configured for recording.

Embodiments of the Invention include the Following Features:

Multi-line Phones

The call recording system can handle recording of multi-line phones, such as those with a primary ACD line and a secondary private line. There is a configurable mapping file that can be utilized to map primary and secondary phone lines. Multiple entries can be added to handle more than two lines on a single phone. The call matching algorithm handles derivation of complex call scenarios using primary and secondary lines on a single phone (as shown in the example of FIG. 7 above. This is required to handle complex call types, including hold, transfer, conference scenarios. This mapping mechanism can be derived.

Worksheet Feature

As discussed above, in addition to analysing whether calls are being recorded correctly, embodiments of the invention automatically detect business rule configuration mismatches. The comparison is done between the call recording system and the PBX, or call routing system Worksheets are utilized for detecting issues with badly configured integrated PBX/ACD/Turret equipment. This can be utilized to automatically detecting business rule configuration mismatches done manually by users and other issues that cause call recording to fail in this environment. This allows automatic determination of configuration mis-matches between the call recording system and the call processing system.

Daily Check Feature

The system monitors performance of its components periodically. In particular, the system performs regular checks on whether it has the necessary resources available to perform call recording successfully, including trunk capacity, licenses, DSP utilization, port capacity, system performance (CPU, Disk, Memory) usage. The performance is compared against predefined performance parameters and if any components operate below the system requirements a signal is raised.

Voice Quality Feature

The data stored with the media file includes in-flight Mean opinion score (MOS) score to the call recording system is inadequate. This feature can be important for centralized call recording models that require longer IP transport of the RTP media involved in the call, with the chance of introducing packet loss, jitter or latency which will degrade the quality of the recording.

End to end monitoring of critical integration points

Call monitoring can be utilized to monitor critical application level failures in the call recording system, this can be integrated with alerts which can be utilized to provide alerts on the key integration links between the systems.

The critical integration points include interaction with the PBX, ACD or Turret system, as well as the geographical distribution of call recording systems into data center and site architectural components respectively.

Cradle to Grave Feature

This feature traces a call from when it starts to when it stops, including showing all routed devices, end to end voice and signalling paths and recording functionality across session border controllers (SBCs), PBX/ACD devices all the way to the end phone or agent device.

Reporting Feature

Report all recorded calls with appropriate metrics

Call abandonment analysis reports-probable cause and recommended actions

Configurable reports based on roles

Alarm reports

Configurable reporting mechanisms (text, phone, document, notifications)

Active call recording test—In addition to passive call recording capability, active call recording can be used to validate critical parameters of the call including:

Whether valid CTI attached data is available for the call.

Whether the file is of the correct file size and contains valid audio recording sample.

This can be done utilizing the passive data feed from the call processing system. This can be utilized as an automatic mechanism for providing validation, in combination with the active call recordings described earlier.

Archiving Validation Test

This provides the capability to validate whether there is a valid media archive for a sample call scenario. This can be done by validating the file archive is valid off the storage area network (SAN) or content addressable storage system (s) utilized by the call recording system. This archiving validation can utilize old call sample data to identify calls to validate against the archiving system.

It will be clear to those skilled in the art that embodiments of the present invention provide a system in which recorded call media files can be mapped to call data. Embodiments apply recording rules in call routing systems and call recording systems and determine whether calls have been correctly recorded. Further embodiments compare recording rules between call recording systems and call routing systems to identify configuration errors and inconsistencies.

It will be clear to those skilled in the art that references to calls in the description and claims include communications including telephone calls or other audio calls or video calls.

The invention claimed is:

1. A method for analyzing performance of a media recording system in a telecommunications network comprising multiple network extensions, the method comprising the steps of:

selecting a network extension within the telecommunications network, the network extension capable of exchanging communication media;

receiving from a database communications data for the network extension, the communications data comprising data associated with communications involving the network extension that occurred within a designated time period;

receiving recorded media data for the network extension, the recorded media data comprising data associated with recorded media content of the communications involving the network extension within the designated time period;

receiving rules defining whether a communication for the network extension should be recorded;

applying the rules to the communications data for the network extension to create filtered communications data, the filtered communications data for the network extension associated with communications which should have been recorded; and comparing the communications data with the media data to determine whether the communications were recorded in accordance with the received rules.

2. The method according to claim 1 wherein communications data includes at least one of the following:
ANI;
DNIS;
start time of communication;
end time of communication;
duration of communication;
extension number of parties engaged in the communication;
calling extension;
receiving extension;
recorder ID;
call ID; and
location of participants in communication.

3. The method according to claim 1 comprising the step of:
analysing the communications data to identify a communications scenario including a plurality of communications data;
calculating an expected number of media recordings from the analysed communications data,
wherein the step of comparing the communications data with the media data compares the expected number of media recordings with media data.

4. The method according to claim 1 wherein calls started within a predetermined time of the time interval are disregarded.

5. The method according to claim 1 wherein communications data relating to communications having a duration below a predefined time period are discarded.

6. The method according to claim 1 wherein the performance of the communications recording system is determined on whether the number of expected media recordings matches the number or media records.

7. The method according to claim 1 wherein the extension is associated with a communications device.

8. A call management system comprising:
a call processing system configured to connect calls within a communications network;
a call recording system configured to record call media associated with connected calls within the communications network;
a first rules database comprising criteria for selecting a first set of calls to be recorded, the first rules database associated with the call processing system and the first set of calls occurring within a designated time period;
a second rules database comprising criteria for selecting a second set of calls to be recorded, the second rules database associated with the call recording system and the second set of calls occurring within the designated time period; and
an analysis system configured to compare the criteria of the first and second rules databases and determine whether the first set of calls matches the second set of calls.

9. The call management system according to claim 8 wherein the rules of the first and second rules database specify that calls should be recorded in dependence on at least one of:
time of communication;
calling party extension; and
receiving party extension.

10. The call management system according to claim 8 further comprising:
communications routing system configured to receive a request to connect a communication across the communications network at a call processing system;
processor for determining whether the communication should be recorded in accordance with the rules database; and
transmitter for transmitting an instruction to a recording system to record the call in dependence on the determination.

11. The call management system according to claim 8 further comprising;
communications recording system, the communications recording system comprising:
a receiver for receiving an instruction to record a communication;
processor for determining whether the communication is required to be recorded in dependence on recording rules; and
recorder for recording the communication in dependence on the communication being required to be recorded.

12. A system for analyzing performance of a media recording system in a telecommunications network, the system comprising:
a processor for selecting an extension within a telecommunications network, the extension capable of exchanging communication media;
a receiver for receiving communications data for the network extension, the communications data comprising data associated with communications involving the extension that occurred within a designated time period;
a receiver for receiving media data for the network extension, the media data comprising data associated with recorded media content of the communications involving the extension within the designated time period;
a memory configured to store rules defining whether a communication should be recorded;
a data filter configured to apply rules to the communications data to create filtered communications data, the filtered communications data associated with communications which should have been recorded; and
a matching engine for comparing the communications data with the media data to determine whether the communications were recorded in accordance with the received rules.

13. The system according to claim 12 wherein communications data includes at least one of the following:

ANI;
DNIS;
start time of communication;
end time of communication;
duration of communication;
extension number of parties engaged in the communication;
calling extension;
receiving extension;
recorder ID;
call ID; and
location of participants in communication.

14. The system according to claim 12 comprising:
processor for analysing the communications data to identify a communications scenario including a plurality of communications data and calculating an expected number of media recordings from the analysed communications data,
wherein the step of comparing the communications data with the media data compares the expected number of media recordings with media data.

15. The system according to claim 12 wherein calls connected within a predetermined time of the time interval are disregarded.

16. The system according to claim 12 wherein communications data relating to communications having a duration below a predefined time period are discarded.

17. The system according to claim 12 wherein the performance of the communications recording system is determined on whether the number of expected media recordings matches the number or media records.

18. The system according to claim 12 comprising an alert means to trigger an alert in dependence on the performance of the media recording system.

* * * * *